US009312969B2

(12) United States Patent  
Kerber et al.

(10) Patent No.: US 9,312,969 B2
(45) Date of Patent: Apr. 12, 2016

(54) REMOTE SERVER SYSTEM FOR COMBINING AUDIO FILES AND FOR MANAGING COMBINED AUDIO FILES FOR DOWNLOADING BY LOCAL SYSTEMS

(75) Inventors: William Kerber, Scott Township, PA (US); Jeffrey A. Thomas, Mona Vale (AU)

(73) Assignee: North Eleven Limited, St. Helier Jersey (GB)

( * ) Notice: Subject to any disclaimer, the term of this patent is extended or adjusted under 35 U.S.C. 154(b) by 979 days.

(21) Appl. No.: 12/761,328

(22) Filed: Apr. 15, 2010

(65) Prior Publication Data

US 2011/0257772 A1    Oct. 20, 2011

(51) Int. Cl.
*G06F 17/00* (2006.01)
*H04H 20/38* (2008.01)
*H04H 20/82* (2008.01)

(52) U.S. Cl.
CPC .............. *H04H 20/38* (2013.01); *H04H 20/82* (2013.01)

(58) Field of Classification Search
CPC .............................. H04H 20/38; H04H 20/82
USPC ........................................................... 700/94
See application file for complete search history.

(56) References Cited

U.S. PATENT DOCUMENTS

| 5,623,690 | A * | 4/1997 | Palmer et al. .................. 715/202 |
|---|---|---|---|
| 6,118,450 | A * | 9/2000 | Proehl et al. ................... 715/810 |
| 6,766,300 | B1 * | 7/2004 | Laroche .................... G10H 1/40 704/211 |
| 7,333,864 | B1 * | 2/2008 | Herley .............. G06F 17/30743 381/58 |
| 7,343,141 | B2 * | 3/2008 | Ellis et al. ...................... 455/132 |
| 7,787,818 | B2 * | 8/2010 | Shapiro et al. ................ 455/3.01 |
| 7,787,973 | B2 * | 8/2010 | Lambert ............. H04L 65/4076 700/94 |
| 7,899,390 | B1 * | 3/2011 | Littlejohn ............ H04H 20/103 379/101.01 |
| 7,966,184 | B2 * | 6/2011 | O'Conor et al. .............. 704/260 |
| 8,014,883 | B2 * | 9/2011 | Jania et al. ....................... 700/94 |
| 8,176,058 | B2 * | 5/2012 | Ott, IV .......................... 707/752 |
| 8,209,602 | B2 * | 6/2012 | Chatow et al. ................ 715/255 |
| 8,239,327 | B2 * | 8/2012 | Healy et al. ..................... 705/51 |
| 8,270,815 | B2 * | 9/2012 | Yen et al. ....................... 386/278 |
| 8,666,807 | B1 * | 3/2014 | Murray .............. G06Q 30/0241 705/14.4 |
| 8,719,080 | B2 * | 5/2014 | Ferry ..................... G06Q 30/02 705/14.1 |
| 2002/0177914 | A1 * | 11/2002 | Chase .................. H04H 20/103 700/94 |
| 2004/0024478 | A1 * | 2/2004 | Hans et al. ....................... 700/94 |
| 2004/0039796 | A1 * | 2/2004 | Watkins ........................ 709/218 |
| 2005/0172121 | A1 * | 8/2005 | Risan ..................... G06F 21/60 713/164 |

(Continued)

OTHER PUBLICATIONS

NexGen User Guide: Copyright 2006.*

(Continued)

*Primary Examiner* — Paul McCord
(74) *Attorney, Agent, or Firm* — Gordon Rees Scully Mansukhani LLP (57) ABSTRACT

A web-based method of combining time coded audio files, having the following steps: (a) a local operator using a web-based interface displayed on a local computer system to access a library of audio files stored on a remote system; (b) the local operator using the web-based interface to select a plurality of the audio files from the library; (c) the local operator using the web-based interface to request the remote system to combine the selected audio files into a single combined audio segment comprising the selected audio files commencing play at audio cue markers; (d) the remote system generating the single combined audio segment by combining the plurality of selected audio files; and (e) the local operator using the web-based interface to download or stream the single combined audio segment.

48 Claims, 5 Drawing Sheets

(56) References Cited

U.S. PATENT DOCUMENTS

| | | | |
|---|---|---|---|
| 2006/0092282 A1* | 5/2006 | Herley et al. | 348/207.99 |
| 2006/0095516 A1* | 5/2006 | Wijeratne | 709/205 |
| 2006/0268667 A1* | 11/2006 | Jellison et al. | 369/30.08 |
| 2006/0282533 A1* | 12/2006 | Steelberg et al. | 709/224 |
| 2007/0050382 A1* | 3/2007 | Bugir | G06F 8/20 |
| 2007/0076547 A1* | 4/2007 | Rahman | G06F 21/10 369/47.15 |
| 2007/0083897 A1* | 4/2007 | Brownell | 725/61 |
| 2007/0094139 A1* | 4/2007 | Martinez | G06Q 10/10 705/40 |
| 2007/0100829 A1* | 5/2007 | Allen | G06F 17/3089 |
| 2007/0130581 A1* | 6/2007 | Del Sesto et al. | 725/36 |
| 2007/0162395 A1* | 7/2007 | Ben-Yaacov et al. | 705/51 |
| 2007/0189708 A1* | 8/2007 | Lerman et al. | 386/52 |
| 2007/0291297 A1* | 12/2007 | Harmon et al. | 358/1.15 |
| 2008/0147558 A1* | 6/2008 | Kraus | 705/59 |
| 2008/0152039 A1* | 6/2008 | Shah | H04H 60/27 375/316 |
| 2008/0184138 A1* | 7/2008 | Krzanowski et al. | 715/760 |
| 2008/0288862 A1* | 11/2008 | Smetters | G06F 17/218 715/255 |
| 2009/0053991 A1* | 2/2009 | Mantel et al. | 455/3.04 |
| 2009/0061764 A1* | 3/2009 | Lockhart et al. | 455/3.06 |
| 2009/0063511 A1* | 3/2009 | Myers | G06F 17/3089 |
| 2009/0087161 A1* | 4/2009 | Roberts | G11B 27/031 386/282 |
| 2009/0158141 A1* | 6/2009 | Bauchot | G06F 17/30899 715/239 |
| 2009/0259326 A1* | 10/2009 | Pipitone et al. | 700/94 |
| 2009/0292984 A1* | 11/2009 | Bauchot | G06F 17/30896 715/234 |
| 2010/0063873 A1* | 3/2010 | McGucken | G06Q 30/02 705/14.4 |
| 2010/0095324 A1* | 4/2010 | Schuster | H04H 60/06 725/32 |
| 2010/0115060 A1* | 5/2010 | Julia et al. | 709/219 |
| 2010/0280641 A1* | 11/2010 | Harkness | H04H 20/31 700/94 |
| 2010/0304664 A1* | 12/2010 | Littlejohn | H04H 60/46 455/3.06 |
| 2011/0015968 A1* | 1/2011 | Carlson | 705/10 |
| 2011/0029110 A1* | 2/2011 | Hohl et al. | 700/94 |
| 2011/0083074 A1* | 4/2011 | Jellison, Jr. | G06F 3/0481 715/716 |
| 2012/0155233 A1* | 6/2012 | Spitzlinger | G06F 21/10 369/30.09 |
| 2012/0281859 A1* | 11/2012 | Villemoes | G10L 21/038 381/98 |

OTHER PUBLICATIONS

NexGen webpage: available at archive.org at least Feb. 7, 2009.*
Radio Audiomation article; Copyright 2002.*

* cited by examiner

REMOTE SERVER SYSTEM FOR COMBINING AUDIO FILES AND FOR MANAGING COMBINED AUDIO FILES FOR DOWNLOADING BY LOCAL SYSTEMS

TECHNICAL FIELD

The present invention relates to systems that combine separate audio files, and to systems that manage combined audio files.

BACKGROUND OF THE INVENTION

Nationwide, there are thousands of local radio stations. Many of these local radio stations have quite similar playlists and play similar themed music. These local radio stations all purchase their music from national services. The national services supply the music, but the creation of the "local station identifiers" has always been left up to the local radio stations themselves.

These unique local station identifiers are typically played both during and between songs, and can be linked to particular programs, contests and awards. The variety of local station identifiers can include the local stations announcing their call signals, or playing a sound, tune or jingle. Typically, these unique station identifiers combine music clips with a voice-over announcement. For example, an announcement like: "This is station KABC playing the hits" can be played over a combination of clips of various songs that best exemplify the playlist of that station.

Designing unique local station identifiers for local radio stations is quite important since this is what "brands" the local station in the minds of its listeners. Therefore, the music selected to be played in the background behind a vocal announcement must be both current and representative of the music played by the station. The songs that are most current are always changing and it is therefore desirable to keep re-formulating the station identifiers such that the most up-to-date music can be played together with the various voiceovers.

As a result, preparing these station identifiers involves a lot of work and audio engineering. Typically, an audio engineer at each local radio station must combine the desired audio files (e.g.: the music or music clips played together with the voice-over) into a single audio file that can be played by the local radio station. Unfortunately, the software that is currently in use for this sort of radio production services requires local assembly and expertise by a person with a high level of audio skills. There is simply currently no automated solution for creating and downloading pre-mixed audio content that is uniquely branded for each particular radio station. Thus, for audio material that is meant to go out to hundreds of radio stations, existing tools do not allow the audio content to be individually customized for each of these stations. Therefore, mass scale customization for local radio stations has currently been impossible. It would instead be desirable to provide a system for large scale internet distribution of audio content with individual radio station customization.

Secondly, existing internet based audio mixing software does not allow the combination of two or more WAV audio files using cuing time markers codes to be output as a single audio file—with the possibility for these two files to be playing simultaneously. It would instead be desirable to provide a system in which audio files could easily be combined, but with their individual play times being staggered such that they may overlap while starting at different cueing times.

Lastly, existing audio software that is based on MP3 files does not adhere to consistent time code cueing markers. In other words, each output file will have differences, even if made up of the same components. It would instead be desirable to provide a system that operates with MP3 files, but does not have these limitations.

SUMMARY OF THE INVENTION

The present invention provides a system comprising a network hosted on remote servers for combining separate audio files into single combined audio files for preview and downloading to local users over the Internet. Preferably, this system is accessed and operated simultaneously by a plurality of local users, each viewing a web-based interface that may use FLASH and/or HTML.

In accordance with the present invention, the audio files are combined on remote servers and are then sent to the various operators at their local systems. During operation, two or more audio files are preferably combined and are then heard simultaneously as a single output audio file, based on a user-selected sequence. Each local operator is therefore provided with combined audio files that are complete and finished with all the components that make up that piece integrated seamlessly.

The present invention is ideally suited for providing audio content to a number of different local radio stations, such that the audio content can be individually customized for each of the local radio stations. In addition, the present invention provides an automated audio mixing system for a local radio station to mix their own local content into content supplied by a central provider. This pre-mixed content can then be downloaded and played on the local radio station (such that the local station is "imaged" with name branded audio).

In accordance with the present invention, a radio station can subscribe to a service operating the present invention such that they can select audio components that are generic in nature and combine with local content customized to their station's name, theme or identity. In preferred aspects, these local radio stations can mix together two or more audio files within a web platform to create a single audio file which then can optionally be output (i.e.: previewed and downloaded) as either a WAV or MP3 file.

The final resultant combined file is delivered fully mixed by the system to the operator. Thus, mass market customization can be provided for radio stations (wherein all the expensive and time consuming audio mixing is handled by the remote servers' software, rather than by audio engineers working at each of the local radio stations).

In one preferred aspect, the local "user side" of the present invention provides a web-based method of combining time coded audio files, comprising the following steps:

(a) a local operator using a web-based interface displayed on a local computer system to access a library of audio files stored on a remote system;

(b) the local operator using the web-based interface to select a plurality of the audio files from the library;

(c) the local operator using the web-based interface to request the remote system to combine the selected audio files into a single combined audio file comprising the selected audio files commencing play at audio cue markers;

(d) the remote system generating the single combined audio segment by combining the plurality of selected audio files; and (e) the local operator using the web-based interface to download or stream the single combined audio segment.

Opposite to the "user side" is the "administration side" of the present invention. The "administration side" of the present invention is performed by an administrator at the remote system adding files to the library or/or altering details or properties of the audio files in the library. In one preferred aspect, the "administration side" of the present invention comprises the method of:

(a) the remote operator using a web-based interface to assign a sequence order to each of the library of audio files; and (b) the remote operator using the web-based interface to assign the audio cue markers to each of the library of audio files.

The present invention also preferably comprises a computer system for combining time coded audio files, comprising:

a remote system hosted on a remote server, the remote system comprising:
  (a) a library computer system accessing a library of audio files;
  (b) a processing computer system operating a program for combining the audio files stored in the library of audio files; and
  (c) a communication computer system for receiving instructions from a plurality of local operators at a plurality of different local systems, wherein each of the local operators operates the communication system to select audio files stored in the library of audio files for combination by the processing system into a single combined downloadable or streamable audio segment.

Preferably, the single combined audio segment is a downloadable file. In alternate embodiments, however, the single combined audio segment is instead streamed to the local user(s).

A main advantage of the present invention is that it provides a remotely hosted web-based system for delivering audio content that is customized to each of the specific local end users. These end users can choose user specific audio content modules and then combine them with "global" content audio modules (i.e.: content available to multiple users). As a result, the present system can generate single pieces of audio content made up of different audio modules. The present invention provides a very simple interface to create very complex mixed pieces of audio.

A further advantage of the present invention is that database management performed by the administrator at the remote system substantially reduces the amount of "audio engineering" that needs to be performed by the local operators. For example, the administrator loads the audio files onto the system, sets up the audio cuing markers for the files, categorizes the files, etc. The present system is then pre-set to know exactly how to combine the audio files when the user selects them. The present audio mixing software combined with database management at the administration (i.e.: remote) side permits the audio engineer managing the present system to define all cuing markers and relationships between the audio on the server side, so that automatic mixing is possible. Thus, the local operators do not need to manipulate parameters like volume, equalization, compression, panning etc to create a mixed audio segment.

DETAILED DESCRIPTION OF THE DRAWINGS (a) Overview

The present invention provides a web-based interface that permits a plurality of local users (working separately on their own local computers) to combine and arrange audio content on a network hosted on remote servers. The audio content comprises modularized short audio clips that can be combined in overlapping linear sequences. This combined audio content can then be downloaded as a single audio segment (i.e. file or audio stream).

As will be explained, by providing audio content through a centralized remote network, different local users can be provided with different content and features. Some audio components and features may be provided to all users whereas some audio components and features may be provided to only some users, as is desired. Thus, the present system provides individual users with options for personalizing or customizing their audio file production.

In accordance with the present invention, the audio content is manipulated at a centralized network hosted on remote servers. This is fundamentally different from current existing audio mixing systems in which audio content is simply combined and manipulated at the user's own local computer terminal.

(b) Exemplary Operation in the Context of Local Radio Stations

The present invention is ideally suited for the distribution and customization of syndicated radio audio content. When used in this context, a plurality of local radio stations use the present invention to mix audio by combining audio clips they select for downloading as single audio files. When played back, these resulting combined audio files simply sound like the separate audio files being played one on top of the other. For example, one such audio file may simply be a tune or jingle (used by multiple radio stations) combined with a unique voice over announcing the name of the particular local radio station. Moreover, the present invention provides a system to combine clips from several popular songs all played together, but with a voice over announcing the name of the particular local radio station.

As can be appreciated, there are many different radio stations playing the same types of music. For example, there are a large number of radio stations playing "Top 40" music. They may each desire a "voice over" station identifier with their own local call sign broadcast over a combination of current Top 40 song clips playing in the background. With the present invention, it is possible to prepare the same combined Top 40 song clips for all of these stations, but then have each of the local radio stations individually customize their own audio clips by mixing in their local station call signs. With the present invention, each of these local radio stations can create, store and access their own unique "voice over" audio file. Similar arrangements can be made with local radio stations having other music themes (e.g.: Classical, Gospel, Alternative, etc. radio stations). For example, an audio file combination of classical tunes can be made available to all of the classical radio stations. Then, each of these classical radio stations can combine this audio file together with their own particular station name announcement "voice over" audio file. Other variations are possible, all keeping within the scope of the present invention. For example, different radio stations of the same genre may still wish to use the same songs, yet combine them in a different sequence order.

(c) The Physical System Components of the Present Invention

Figure 1:
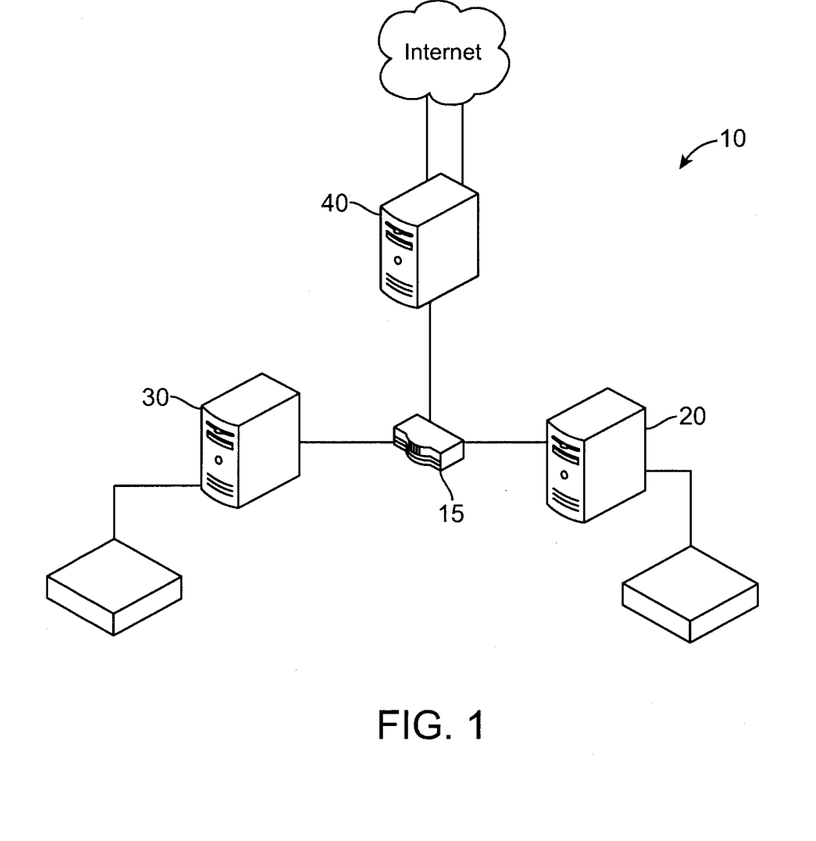
FIG. 1 is a schematic illustration of the physical components of the present invention.

FIG. 1 is a schematic illustration of the physical components of the present invention, as follows. A remote computer network system 10 is provided for combining and managing time coded audio files. System 10 is hosted on remote servers, and comprises: (a) a library computer system 20; (b) a processing computer system 30; and a communication computer system 40. Library computer system 20 stores references to a library of audio files in a database that also holds all of the information about the users, the audio files, the history of the audio files, the types of audio files, and session information. In one preferred embodiment, the audio files themselves are stored in processing computer 30 and a reference or link to the files is stored in library computer system 10. Alternatively, however, the present invention also comprises a system in which the audio files themselves are stored in library computer system 10. Preferably, each of computer systems 20, 30 and 40 are separately hosted on different remote servers, as part of a remote network. As will be explained further below, system capacity can be expanded by adding additional (library, communication or processing) servers.

Processing computer system 30 operates a program for combining the audio files stored in the library of audio files. Processing computer system 30 thus handles the merging and managing of the audio files. Communication computer system 40 is configured for communicating with a plurality of different local users through the Internet. The local operators communicate with communication computer system 40 and communication computer system 40 communicates with each of library computer system 20 and processing computing system 30. Processing computer system 30 and library computer system 20 also communicate with one another. The communication among computer systems 40, 30 and 20 all passes through a private network router 15.

Figure 2:
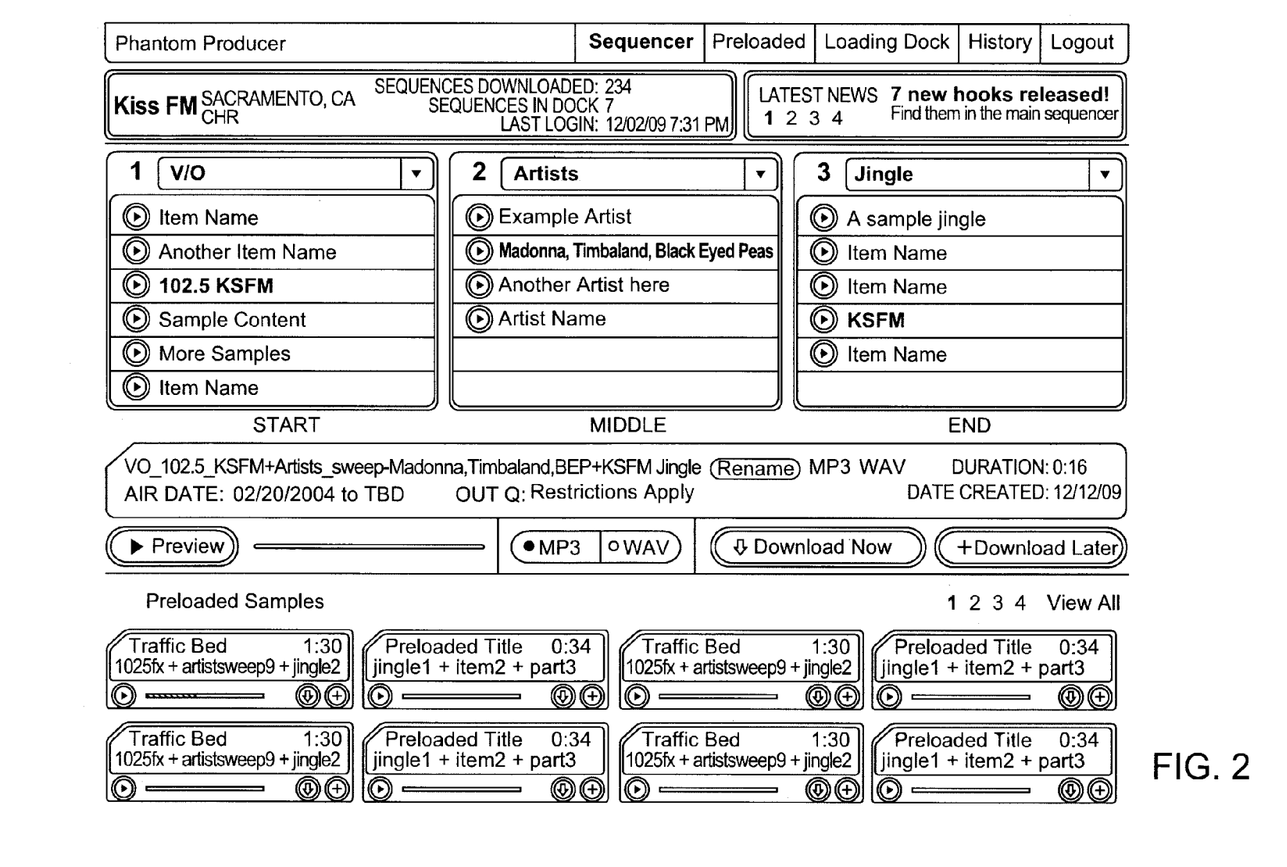
FIG. 2 is a screen shot of a web-based interface in accordance with the present invention.

During standard operation, communication computer system 40 receives instructions from the local operators, such that each of the local operators selects audio files stored in the audio file library for combination by processing computer system 30 into a single combined downloadable audio segment. This audio segment may be either a downloadable file or a segment streamable over the Internet. Communication computer system 40 communicates with the plurality of local operators through a web-based interface which may optionally be operated in FLASH and/or HTML. (A screen shot of an exemplary web-based interface is shown in FIG. 2.)

Processing computer system 30 embodies and operates a computer program for combining the plurality of audio files into a single combined audio file. In optional preferred aspects, this computer program may be "SoX" ("Sound eXchange"™). It is to be understood, however, that the present invention is not limited to any particular audio software program; and that "SoX" is merely one example keeping within the scope of the present invention.

The library of audio files preferably include both global audio files (available to many local users) and user-specific audio files (available only to one local user).

Each local operator communicates with the remote system through communication computer system 40 to assign a sequence order to each of the plurality of selected audio files such that the plurality of selected audio files can then be combined by processing computer system 30 into a single combined audio segment comprising the selected audio files played in the sequence order, with each of the selected audio files commencing play at the desired cue markers. (Further explanation is presented in FIGS. 3A to 3C below).

Note: the present invention encompasses systems in which the local operators only select the audio clips (and the audio clips are played in a pre-determined order), and also systems in which the local operators select both the audio clips and their sequence of play.

FIG. 2 is a screen shot of an exemplary web-based interface as viewed by a local system operator. In accordance with the present invention, each local operator communicates with communication system 40 through this user interface to select and combine audio files (by processing system 30) into a single downloadable audio segment with the sequential audio files commencing play at pre-assigned cue markers. (Note: in this embodiment, the cue markers for the various audio files are preferably pre-assigned by the system administrator when these files are initially loaded into the audio library).

This screenshot shows an example of three audio categories that the local user sees. The local users then have the power to choose different combinations of individual audio clips from these three categories to make a final audio piece. Specifically, the user chooses a clip from column 1 called "voiceover V/O" (which plays first), followed by a clip from column 2 called "Artists" (which plays second) followed by a clip from column 3 called "Jingle" which plays third.

Figure 3A:
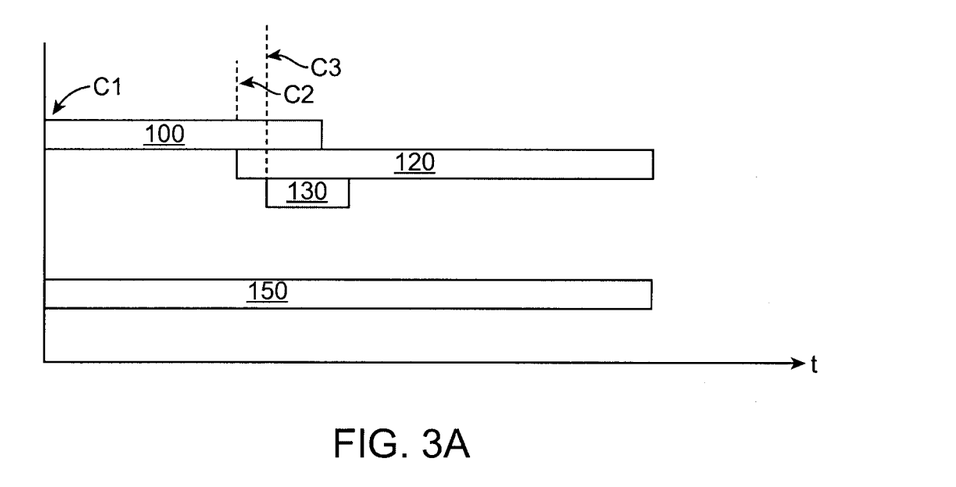
FIGS. 3A and 3B are schematic "time line" illustrations of various combined audio files.
Figure 3B:
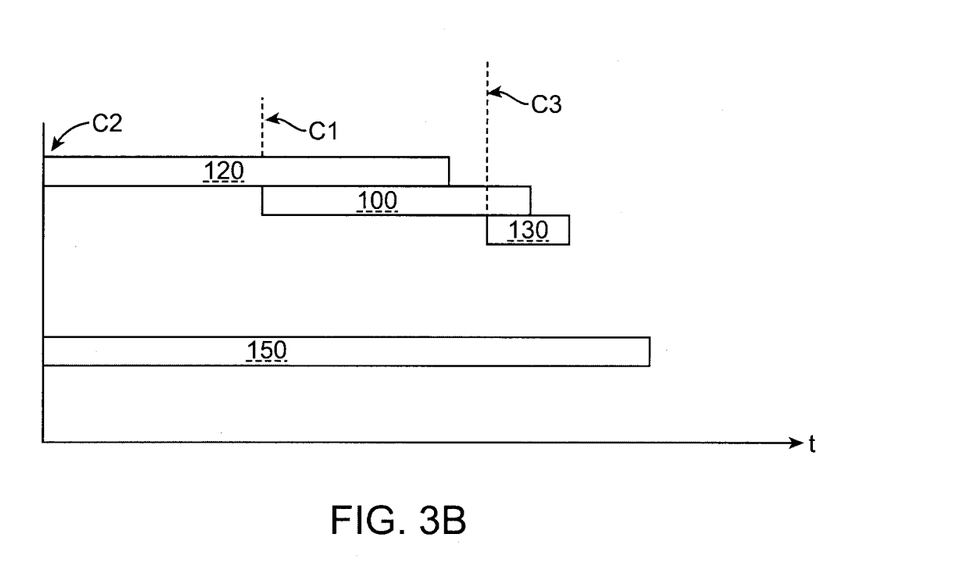

Examples illustrating the combination of various audio files in different playing sequences are shown in FIGS. 3A to 3C, as follows.

FIG. 3A shows three separate audio clips 100, 120 and 130. The local operator accessing the system decides to select these three particular audio clips (100, 120 and 130) from a large library of audio clips (stored on library system 20). As can be seen, audio clip 100 is shorter in playing time than audio clip 120. Audio clip 130 is shorter in length than either of audio clips 100 or 120. Specifically, audio clip 100 is selected to play first at time C1. Next, audio clip 120 is selected to start playing at a time defined by second cue marker C2. Lastly, audio clip 130 is selected to begin playing at a time defined by cue marker C3.

Note: in optional aspects of the present invention, the cue markers C1, C2 and C3 can be assigned either as part of the properties of their own audio clips or as part of the properties of the other audio clips. For example, cue marker C1 may be assigned as a property of audio file 100. Thus, whenever file 110 is selected, it begins playing at the time defined by cue marker C1. Similarly, audio file 120 always begins playing at the time defined by cueing marker C2. This embodiment is particularly useful as follows. Returning to FIG. 2, each of the selections in column 1 (i.e.: voiceover "V/O") may have a cueing marker sat to play at time t=0. Thus, no matter which voiceover "V/O" selection the local operator chooses, it starts to play immediately. All of the selections in column 2 (i.e.: "artists") may have a cueing marker pre-set to play at time t=4 seconds. Thus, no matter which artist is selected by the local user, their audio clip starts to play after 4 seconds. Finally, each of the selections in column 3 (i.e.: "jingle) may have a cueing marker pre-set to play at time t=10 second. Thus, no matter which jingle selection the local operator chooses, it starts to play at time t=10 seconds.

It is to be understood, however, that the present invention is not so limited. For example, the cue marker C2 may instead be assigned as a property of audio file 100. Thus, when audio file 100 has played to the point in time defined by C2, then audio file 120 will start to play. In such an example, each of these audio clips has a pre-defined audio cuing marker (information stored on the remote server side) that will govern the cue point for the next clip in the sequence to trigger. Specifically, returning to FIG. 2, the present system can be configured with a cuing marker in audio file 100 such that audio file 120 begins to play at a queuing time defined in audio file 100.

In such preferred embodiments, audio files 100, 120 and 130 have cue markers assigned when they're loaded into the audio library. These individual cue markers apply in all that particular file's interactions with any other file. Therefore, when audio file 100 is selected it will have a cue marker at, for example, 4 seconds, no matter what file follows 100, the next file will always trigger at 4 seconds after audio file 100 began playing.

In accordance with the present invention, the various audio files 100, 120 and 130 are combined into a single audio segment 150. Audio segment 150 is then provided for download by remote computer network system 10. Alternatively, audio segment 150 can be streamed to the user, as desired. During a first portion of audio segment 150, a listener will first hear a portion of audio file 100. Then, the listener will simultaneously hear both audio files 100 and 120. Later in time, the listener will briefly simultaneously hear audio files 100, 120 and 130 playing together. Still later, the listener will briefly simultaneously hear audio files 120 and 130. Finally, the listener will only hear audio file 120 until the end of the combined audio segment 150.

It is to be understood that the present invention is not limited to the specific embodiments and method of operation shown in the screen shot of FIG. 2. For example, FIG. 3B shows an alternate way of combining the playing sequence of audio clips 100, 120 and 130. In this user defined sequence, audio clip 120 plays first. After a few seconds, clip 120 plays together with clip 100. Next, audio clip 120 then ends and audio clip 100 continues to play. Next, audio clip 130 plays together with clip 100. Next, audio clip 100 ends and the listener hears only audio file clip 130 playing until the end. As can be seen in FIG. 3B, the total playing time of combined audio file 150 has a shorter play time than combined audio file 150 in FIG. 3A.

(d) An Exemplary Method of System Operation

In one preferred method, the local operator interacts with remote system 10 to perform the following steps:

Step 1: the operator uses a web-based interface (see FIG. 2) displayed on a local computer system to access a library of audio files stored in library system 20.

Step 2: the operator uses the web-based interface to select a plurality of the audio files (e.g.: 100, 120 and 130) from library system 20. These audio files are pre-organized (by the administrator of the remote system) into categories that define their content and also where they may appear in a sequence, and what their cue markers are. In this embodiment of the invention, the local operator is limited to selecting a sequence based on certain rules held on the server side.

Step 3: the local operator uses the web-based interface to request the remote system 10 to combine the selected audio files 100, 120 and 130 into a single combined audio segment 150 comprising the selected audio files being played in the selected sequence order with the sequential audio files commencing play at cue markers "C" (see examples of FIGS. 3A and 3B).

Step 4: remote system 10 generates the single combined audio segment 150 by combining the plurality of selected audio files 100, 120 and 130.

Step 5: the operator uses the web-based interface to download or stream the single combined audio segment 150.

In preferred aspects, the steps may be performed with the web-based interface operating in FLASH and/or HTML.

In preferred aspects, the steps may be performed by the local operator communicating directly with communication system 40. Communication system 40 then separately communicates with both library system 20 and processing system 40. For example, communication system 40 will inform processing system 30 of the audio file sequence and cue markers C selected by the operator. Library system 20 may also store session information, and communication system 40 may request this session information. After receiving the operator's instructions through communication system 40, processing system 30 may then requesting session verification from library system 20. Library system 20 will then inform processing system 30 that the session has been verified. After this verification, processing system 30 will access the library of audio files (which may be stored in processing system 30 with references to the files stored in library system 20). Then the audio mixing software program embodied in and operated by processing system 30 will combine the operator selected audio files (100, 120 and 130) into the single combined audio segment 150. Finally, processing system 30 will then send the single combined audio segment 150 to communication system 40. Communication system 40 will then serve up audio segment 150 for preview and download by the local operator(s).

In optional aspects, processing system 30 may also send a download queue to library system 20. This download queue can be stored in library system 20 and a copy of the download queue can be archived in processing system 30. Once the finished audio files are saved in the database, the user's history can be reviewed and the finished pieces can be re-downloaded. The finished audio files can then be looked up and if still archived will not need to be recreated, but served as already created audio files saving valuable processing time on processing system 30.

As such, in optional aspects, the following actions may be taken between and among the physical components of the present invention to achieve the preferred method of operation:

1. The user logs in through communication system 40.
2. Communication system 40 requests info from library system 20. (Library system 20 stores individual session information).
3. Library system 20 returns session information to communication system 40.
4. Communication system 40 informs processing system 30 of the selections made by the local operator. (For example, communication system 40 sends the file number for each audio file in the sequence and the local user's ID (which it received from library system 20) to processing system 30).
5. Processing system 30 asks library system 20 for verification (to verify that the specific user is able to access the requested audio files.
6. Library system 20 tells processing system 30 that the session is verified. (After verification, processing system 30 requests the WAV file name, length, and cue marker C for each selected audio file.)

7. The combined audio file generated by processing system 30 is sent from processing system 30 to communication system 40. (i.e.: processing system 30 then mixes the WAV files according to their sequence order, lengths and assigned cue markers C). Thus, sequential audio files are mixed into combined audio segment 150 starting at their successive cue markers (C1, C2, C3).

8. Processing system 30 gives the download queue to library system 20 (and library system 20 saves it).

9. Processing system 30 can optionally pass segment 150 to communication system 40 for direct downloading by a user.

10. Processing system 30 makes an archived copy of the download queue.

It is to be understood that the present system can be used in markets and industries including (but not limited to) broadcast and media material, pod-cast and internet broadcasts, computer games, or any other audio application where audio clips have a length and a style defined so that they interact in a similar way within a sequence.

For example, the present invention could also be used in a video game that wanted to incorporated someone's name in it. In such an embodiment of the present invention, the person's name could be added on the fly in the middle of two prerecorded effects. This is advantageous in that in that it would save space on the CD/DVD of the game (and offload the addition of the name sound file onto a server system). There would be no need for a user interface. Rather, the game code would interact directly with the web server.

An important advantage of the present physical system configuration is that multiple communication, library and processing systems can each be hosted on dedicated servers. As a result, it is possible to expand network 10 as load requires (due to separation of communication, library and processing servers). At the end of every interaction (page load) the session data is stored back into the library system 20. This allows remote network 10 to expand and use round-robin style load balancing on the communication server 40 without affecting the user experience.

This system allows for multiple library, processing, and communication servers to be expanded as load requires. They can be added asynchronously. The separation of services allows for unlimited expansion of this system. The processing system server 30 works independently of communication server 40 but requires a data store to organize the files (such as library server 20). A processing system server 30 could easily have another interface built and accomplish different mixes of audio, as long as it had records containing the proper information about the file. A plurality of processing servers 30 could be added and put into the rotation of the communication server 20 to handle a larger load. Library servers 20 can also be put into rotation with the use of data replication to handle a larger load.

(e) A Radio Station Example

In accordance with the present invention, audio content can be distributed to multiple radio stations, with the audio content being individually customized. This is accomplished by delivering audio files as "building blocks". The present invention provides a platform for assembling these building blocks in a variety of different combinations, controlled by the local end user, without the need for specialist technical knowledge or equipment.

The present system is deal for delivering customized on-air "imaging" and branding material (e.g.: audio content that defines the image of a radio station, commonly known as "jingles" and "sweepers"). Individual radio stations can then use the present system to take these modular audio files and combine them with "global" audio files (available to many local operators), producing combined audio files for on-air delivery. These "global" audio imaging modules can be updated in the remote server system on an on-going basis.

For example, FIG. 2 illustrates a screen shot where the user simply highlights a filename (in 3 columns) and then selects "preview". At that time, a completed audio sweeper or jingle is generated (as combined audio file 150). Alternatively, the user could instead select a "suggested" pre-programmed sequence (being a sequence of three audio files that are prearranged to reflect common radio industry audio requirements).

Figure 4:
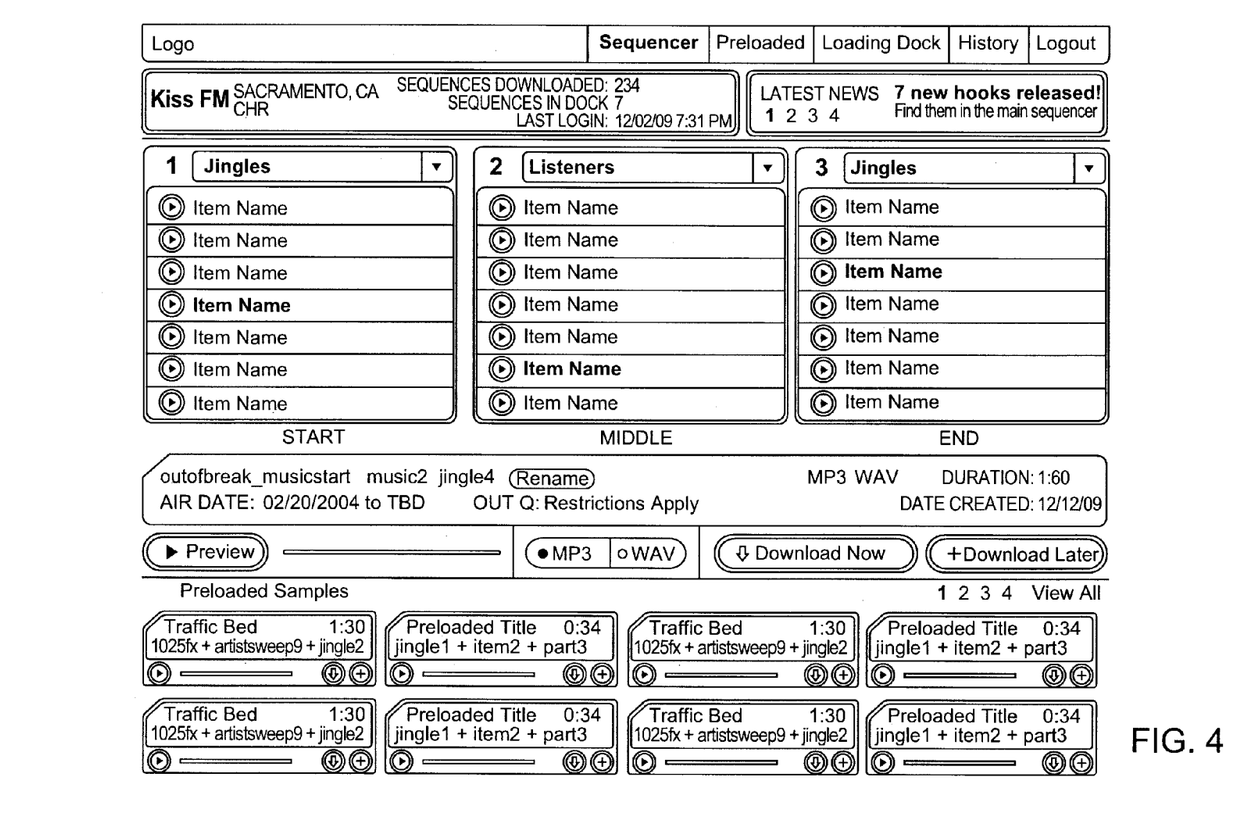
FIG. 4 is a screenshot through which a local user chooses a sequence of audio clips comprising a "jingle", followed by a "listener" followed by another "jingle".

FIG. 4 illustrates a screenshot where the local user creates a combined audio segment by selecting a "jingle", followed by a "listener" followed by a "jingle". The first column shows 'jingles' that may be used as the start of the audio sequence and the third column shows 'jingles' that may be used at the end of the audio sequence. The user selects a first jingle from the options in the first column. Next, the user selects a preferred "listener" from the second column. Note: the term "listeners" could instead be one of a number of other commonly used radio content styles, 'artists,' 'beds,' 'music promo', etc. Finally, the user selects the end jingle from the choices in the third column. Once an item has been selected in all three columns, the user is able to preview the entire audio sequence, and choose to download, or they can amend any or all sections of the sequence.

For Example:

Audio file 100 is a 'VO Front 102.5 KSFM' that runs 14 seconds in total. It has a trigger point (cue marker C1) after 4 seconds. (If listened to alone, this audio file would be a voice saying the words '102.5 KSFM' and then some sort of ambience that runs for the rest of the piece).

Audio file 120 is a 'Artist Sweep—Madonna, Timbaland, Black Eyed Peas' that runs 9 seconds in total, but has a trigger point (cue marker C2) after 7 seconds (If listened to alone, this audio file would be the artists saying introducing themselves and then maybe a drum hit with a reverb tail at the end of the piece).

Audio file 130 is a 'Jingle End KSFM' that runs 5 seconds in total. (If listened to alone, this would be a sung vocal of 'KSFM' with appropriate sound effects).

The present system assembles this audio content such that the resultant audio from audio file 100 plays for 14 seconds, after it has played for 4 seconds, it overlays audio file 120 which runs for 9 seconds. Once audio file 120 has run for 7 seconds (audio file 100 has run 11 seconds at this point), the present system then overlays audio file 130. So, for seconds 12 and 13, all three audio files play simultaneously and then for second 14 audio file 100 continues to play in tandem with audio file 130. Then, for seconds 15 and 16, audio file 130 plays alone.

The bottom section of the screenshot shows 'pre-loaded' sequences that can be retrieved with a single click (these are commonly used radio sequences that most radio stations require). When a pre-loaded sequence is selected, the relevant components appear in the main sequencer section, the pre-loaded sequence can be downloaded as is, or it can be further edited in the main sequencer section.

Figure 5:
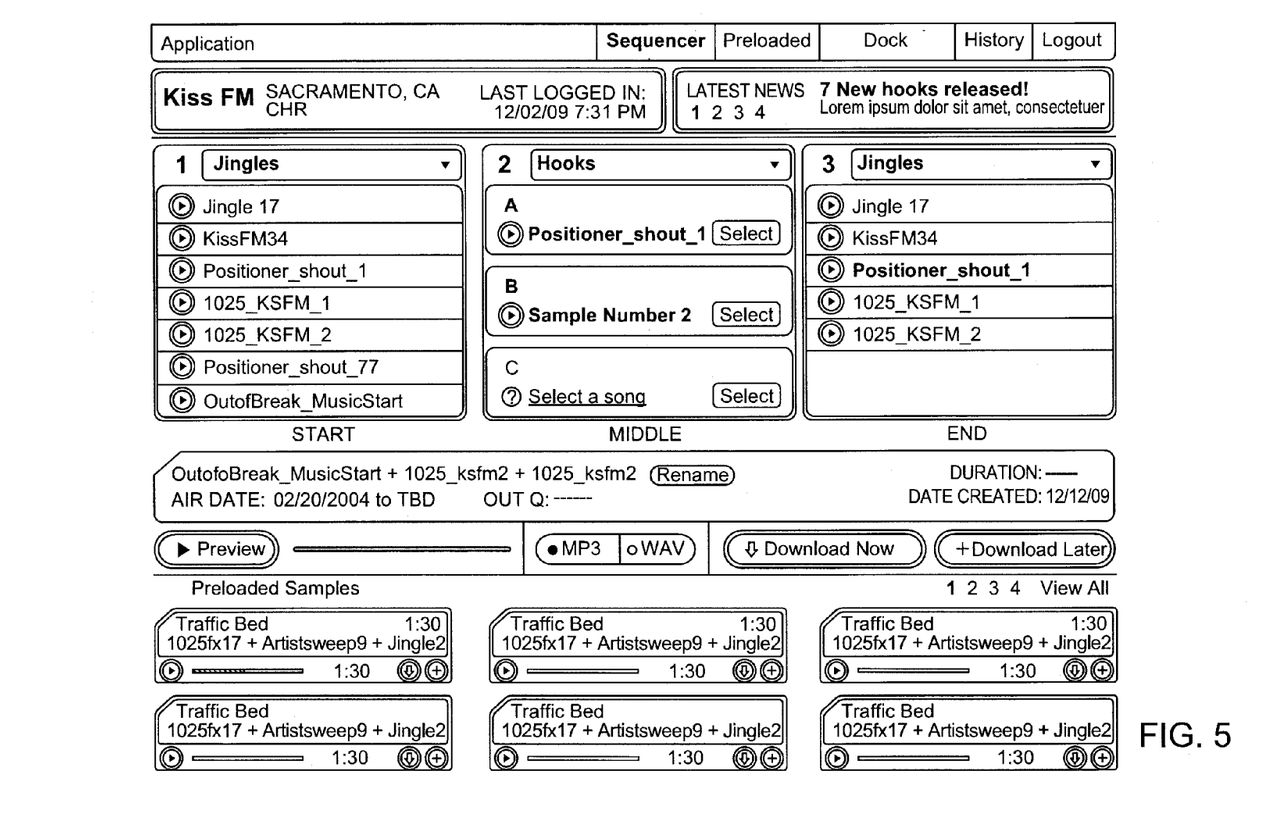
FIG. 5 is a screenshot through which a local user chooses a sequence of audio clips comprising a "jingle", followed by "hooks" followed by another "jingle".

FIG. 5 illustrates a screenshot where the category 'hooks' is selected for the middle section of the main sequencer. When 'hooks' is selected, the middle column now allows selection of a sequence of three items to make up the middle section. As such, the local user chooses three songs (items) specific to their playlist to include in the middle of a mixed audio file, the local user may alter the order of these 'hooks' as they wish.

Note: the present invention also covers the selection of more than three "hooks" to create longer middle sequences, as desired.

As can be seen, the users each log in and sees unique content related to their particular radio station. The illustrated webpage is for "Kiss FM—102.5". As can be seen, the audio content is laid out in "starts", "middles" and "ends". "Starts" and "ends" may be voiceovers (including but not limited to statements of the station's call letters), frequency or other positioning statement. "Middles" are preferably global audio file content (i.e.: audio files having a mass market appeal). The middle section is preferably expandable to include more than one audio file (such that more complex sequences are an option).

As stated above, FIGS. 4 and 5 both show examples of a web-based interface through which a local operator chooses audio content to combine. The local user chooses the appropriate "start", "middle" and "end" (from the drop down menu) that best meets their desires. They have the opportunity to preview the sequence (after it has been created as audio file 150) and then download or change it. The system thus provides a "mix and match" interface in which audio files can be connected in various combinations to create unlimited permutations of audio file combinations. In addition, multiple audio pieces can be downloaded in a single session, and preferably the display will show which sequences the user has previously downloaded. Thus, FIGS. 4 and 5 illustrate detailed examples of combining an audio "front" (audio file 100), "middle" (audio file 120), and "end" (audio file 130) at local radio station 102.5 KSFM.

In various optional embodiments, "fronts" and "ends" may be user specific and the "middle" section may be global. Also, the end user may not wish to use a global middle section, but rather eliminate it to produce shorter station pieces.

As stated above, content available audio files may be "global" or "user-specific".

An example of a piece of global audio file content could be:
(a) Name—'Music Promo Miley, Taylor, Britney'.
(b) Description—A 12 to 15 second piece that contains portions of songs from the various popular artists featuring Miley Cyrus' 'Party in the USA,' Taylor Swift's 'Lovestory' and Britney Spears' '3'.
(c) Category—'Music Promo'

An example of an end user specific piece of audio file content could be:
(a) Name—'Jingle Frequency front 102.5 A'.
(b) Description—A sung vocal '102.5'. (Note: local user content may only be a front or end piece, column 1 or column 3 so that global content is tagged at the start and end with user specific content).
(c) Category—'102.5 KSFM/Fronts/Jingles'.

Thus, the local end user at station 102.5 KSFM can then assemble a music promo with pre-defined music, as follows: (a) the user chooses an appropriate "front" (in this case being 'Jingle Front 102.5 A.'); (b) the user chooses an appropriate "middle" section (in this case being 'Music Promo Miley, Taylor, Britney'), and (c) the user chooses an appropriate "end" (in this case being a "voice over" for station KSFM").

The software of the present invention then generates a preview of these three audio components mixed (as combined audio file 150). The end user then chooses to keep this sequence for download, to modify it, or scrap it. Note: In preferred aspects, the present invention is not limited to systems that combine three or more audio files. Rather, the combination of two or more audio files is also contemplated within the scope of the present invention.

In another example, the end user at station 102.5 KSFM assembles a music promo of user defined music using "hooks", as follows: (a) the end user chooses appropriate "front" (in this case 'Jingle Front 102.5 A.'); (b) the end user selects 'Hooks' in the middle section; (c) a drop down menu allows up to 3 'Hooks' to be chosen; (d) the end user selects 'Party in the USA' as Hook 1; (e) the end user selects 'You belong to me' as Hook 2; (f) the end user selects 'Circus' as Hook 3; and (g) the end user chooses an appropriate 'end', in this case "voice over End KSFM". The present system then generates a preview of these five audio components mixed (as a combined audio file 150). The end user then chooses to keep this sequence for download, to modify it, or scrap it.

The present system looks at the cue markers C (which are "trigger points" for starting the next piece of audio). However, it does not cut the previous piece of audio. Instead, it plays two or more pieces of audio simultaneously. In this way the present system is fundamentally different from existing audio "playlist" systems that simply 'play' audio sequences since the present system allows for multiple pieces of audio to be overlaid at different points in time.

The audio files can initially be placed into library 20 by an audio file "supplier" (which may be the owner/operator of remote network system 10 and/or one or more of the local system operators) as follows:

1. The supplier first creates an audio file. (This audio file is preferably encoded as a ".WAV" file).

2. The supplier uploads the audio file to the remote system 10.

3. The supplier tags this audio file with markers, possibly including, but not limited to the following:
  (a) "Content Type": i.e.: is the audio file "global content" (available to all), or is the audio file "specific content" (available to one single end user).
  (b) "Sequence Number": (i.e.: the assigned play sequence—whether the audio file selected will always be the first, second, or third audio file to be played in the final sequence the end user puts together).
  (c) "Cue Markers": (i.e.: a marker in the audio file indicating when the next audio file is to be played in the sequence. (Note: the cue marker is not the same as the audio end point for the particular audio file).

A directory structure is categorized from the inputted audio files. This ensures that audio files that are distinct to a single end user are stored so that they are only available to that end user. Conversely, audio files that are to be made available to all end users are categorized appropriately so as to be easily identifiable. The database preferably includes information to catalogue the audio files by type so that it is in a structure to allow the local end users to quickly identify the individual audio clips they want to combine.

Each audio file can be stored in the library 20 using different fields, including but not limited to: local user ID, file pathway, cuing marker, length, the time the audio file was created, the time the audio file was last uploaded, etc. Information about each of the local users can also be stored in library system 20 in remote system 10. For example, the local user's ID, their login name and security access questions can all be kept in a database in library 20.

Preferably, the combined audio file can be downloaded in either WAV or MP3 format. WAV files are uncompressed, and therefore any audio cue markers attached to them will correspond to their exact time position on any audio system they're encoded or read on. In contrast, MP3s are compressed. This could result in minute shifts in the audio in relation to its cue markers. Advantageously, files that are mixed in WAY can be "clipped" such that two high volumes don't overlap. This makes WAY a much more reliable format for assembling multiple audio files that rely on cueing marker time code triggers. Therefore, the present process is preferably done in WAY. However, WAV files are significantly larger than MP3 files. MP3s are compressed and have to be decoded first. The user is therefore preferably given the option of downloading either in WAV or MP3 formats.

Preferably, processing system 30 automatically creates a WAV version to preview the sequence and this is added to its database (in library system 20) for that end user so that if the end user previews the same sequence again it will retrieve the audio faster (as it does not have to read the markers again to generate). If MP3 format is chosen by the end user, the present system 10 creates an MP3 copy of the WAV file and makes it available for download. This MP3 copy is tagged to the end user and stored on the server database so that it can quickly be retrieved if the user wants to download it again.

What is claimed is:

1. A web-based method of combining time coded source audio files to produce a plurality of audio segments that are each individually customized for playback on different radio stations, comprising the following steps:
   (a) a plurality of local radio station operators each using a web-based interface displayed on a local computer system, wherein the web-based interface accesses a library of source audio files stored on a remote system, wherein the library, the remote system and the web-based interface are hosted on one or more remote servers;
   (b) the local radio station operators each using the web-based interface to select a plurality of the source audio files from the library;
   (c) the local radio station operators each using the web-based interface to request the remote system to combine the selected source audio files into a single combined audio segment comprising the selected source audio files in at least a partially overlapping sequence, the sequence being selected by the local radio station operator;
   (d) the remote system generating the single combined audio segment for each radio station by combining the plurality of selected source audio files, wherein each single combined audio segment comprises:
      a source audio file that is common to at least some radio stations; and
      a source audio file that is different for at least some radio stations; and
   (e) the local radio station operators each using the web-based interface to access the single combined audio segment from their local radio station,
   wherein the regions of the source audio files which are subject to overlap in a sequence have been predefined by the remote system, and
   wherein the predefined overlapping regions of the source audio files are un-editable by the plurality of local radio operators; and
   wherein the source audio files are combined at the remote system hosted on the one or more remote servers, without further input from the local radio station operators, and are then sent or rendered accessible to each of the different local radio stations.

2. The web-based method of claim 1, wherein the web-based interface operates in FLASH.

3. The web-based method of claim 1, wherein a second remote system having one or more remote servers comprises a communication system, a library system and a processing system.

4. The web-based method of claim 3, further comprising: the local radio station operator communicating with the communication system to access and select the plurality of source audio files to be combined, and to render accessible the combined audio segment.

5. The web-based method of claim 3, wherein the library of source audio files are stored in the library system of one or more remote library servers.

6. The web-based method of claim 3, wherein the library of source audio files are stored in the processing system of one or more remote processing servers.

7. The web-based method of claim 3, wherein the processing system comprises a computer program for combining the plurality of source audio files into the single combined audio segment.

8. The web-based method of claim 7, wherein the computer program is Sound eXchange.

9. The web-based method of claim 3, further comprising: the communication system requesting session information stored in the library system.

10. The web-based method of claim 3, further comprising: the communication system informing the processing system of the source audio file sequence and cue markers.

11. The web-based method of claim 3, further comprising: the processing system requesting session verification from the library system.

12. The web-based method of claim 3, further comprising: the library system informing the processing system that a session has been verified.

13. The web-based method of claim 3, further comprising: the processing system accessing the library of source audio files.

14. The web-based method of claim 3, further comprising: the processing system combining the radio station operator selected source audio files into the single combined audio segment, and wherein the single combined audio segment is a short form audio segment.

15. The web-based method of claim 3, further comprising: the processing system sending the single combined audio segment to the communication system.

16. The web-based method of claim 3, further comprising: the processing system sending a download queue to the library system.

17. The web-based method of claim 16, wherein the download queue is stored in the library system.

18. The web-based method of claim 16, further comprising: the processing system archiving a copy of the download queue.

19. The web-based method of claim 3, wherein the local radio station operator communicates through the web-based interface with the communication system and wherein the communication system communicates with both the library system and the processing system.

20. The web-based method of claim 1, wherein the library of source audio files comprises both global audio files and user-specific audio files.

21. The web-based method of claim 1, further comprising: the local radio station operator using the web-based interface to search for source audio files in the library.

22. The web-based method of claim 1, further comprising: a remote operator using the web-based interface to categorize source audio files in the library.

23. The web-based method of claim 1, wherein the source audio files in the library are stored in categories.

24. A computer system for combining time coded source audio files to produce a plurality of audio segments that are each individually customized for playback on different radio stations, comprising:
   a remote system hosted on one or more remote servers, the remote system comprising:
   (a) a library computer system accessing a library of source audio files;
   (b) a processing computer system operating a program for combining the source audio files stored in the library of audio files; and
   (c) a communication computer system for receiving instructions from a plurality of local radio station operators at a plurality of different local radio stations,
   wherein each of the local radio station operators operate the communication system to select the source audio files stored in the library and the intended sequence of the source audio files,
   wherein the source audio files are combined and sequenced by the processing system into a single combined audio segment comprising the selected source audio files in at least a partially overlapping sequence,
   wherein each single combined audio segment comprises a source audio file that is common to at least some radio stations and a source audio file that is different for at least some radio stations,
   wherein the regions of the source audio files which are subject to overlap in a sequence have been predefined by the remote system, and
   wherein the predefined overlapping regions of the source audio files are un-editable by the plurality of local radio operators; and
   wherein the audio files are equalized, and volume mixed at the remote system hosted on the one or more remote servers, without further input from the local radio station operators, and are then sent or rendered accessible to each of the different local radio stations.

25. The computer system of claim 24, wherein the communication system communicates with the plurality of radio station operators through a web-based interface hosted on the one or more remote servers.

26. The computer system of claim 24, wherein the communication system communicates with the plurality of radio station operators in FLASH.

27. The computer system of claim 24, wherein the processing system comprises a computer program for combining the plurality of source audio files into the single combined audio segment.

28. The computer system of claim 27, wherein the computer program is Sound eXchange.

29. The computer system of claim 24, wherein the library of source audio files comprises both global audio files and user-specific audio files.

30. The computer system of claim 24, wherein the library of source audio files are remotely stored in the library computer system.

31. The computer system of claim 24, wherein the library of source audio files are remotely stored in the processing computer system.

32. The computer system of claim 24, wherein each local radio station operator uses the communication system to assign a sequence order to each of the plurality of selected source audio files such that the plurality of selected source audio files are combined by the processing system into a single combined audio segment comprising the selected audio files played in the sequence order.

33. The computer system of claim 24, wherein a remote operator combines, equalizes, and mixes the volume of the source audio files and uses the communication system to assign audio cue markers to each of the plurality of selected source audio files.

34. The computer system of claim 24, further comprising: at least one local system in communication with the communication system.

35. The computer system of claim 24, wherein the communication system communicates with the library system to access the library of source audio files.

36. The computer system of claim 24, wherein the communication system informs the processing system of the source audio file sequence selected by the operator.

37. The computer system of claim 24, wherein the processing system requests session verification from the library system.

38. The computer system of claim 24, wherein the processing system accesses the library of source audio files.

39. The computer system of claim 24, wherein the processing system sends the single combined audio segment to the communication system.

40. The computer system of claim 24, wherein the processing system sends a download queue to the library system.

41. The web-based method of claim 1, wherein each of the plurality of different local radio stations mix their own local content into content supplied by the remote system.

42. The computer system of claim 24, wherein the audio segments comprise local content mixed in by each of the plurality of different local radio stations into content supplied by the remote system.

43. The web-based method of claim 3, wherein the communication system is stored on one or more communication library servers.

44. The web-based method of claim 3, wherein the communication system, the library system, and the processing system are each hosted on respective remote servers, and wherein the local radio station operator communicates through the web-based interface with the communication system, and wherein the communication system communicates with both the library system and the processing system.

45. The computer system of claim 24, wherein the library computer system, the processing system and the communication system are each hosted on respective remote servers, wherein a web-based interface hosted by the one or more remote server is used by the local radio station operators to communicate with the communication system, and wherein the communication system communicates with both the library system and the processing system.

46. The computer system of claim 24, wherein the library computer system, the processing system or the communication system are hosted on respective remote servers.

47. A user method of combining time coded source audio files to produce a plurality of audio segments that are each individually customized for playback on different radio stations, comprising the following steps:
   (a) a plurality of local radio station operators each using a user interface displayed on a computing device, wherein the interface accesses a library of source audio files stored on a remote system, wherein the library, the remote system and the user interface are hosted on one or more remote servers;
   (b) the local radio station operators each using the user interface to select a plurality of the source audio files from the library;
   (c) the local radio station operators each using the user interface to request the remote system to combine the selected source audio files into a single combined audio segment comprising the selected source audio files in at least partially overlapping sequence, the sequence being selected by the local radio station operator;

(d) the remote system generating the single combined audio segment for each radio station by combining the plurality of selected source audio files, wherein each single combined audio segment comprises:

a source audio file that is common to at least some radio stations; and a source file that is different for at least some radio stations; and (e) the local radio station operators each using the user interface to access the single combined audio segment from their local radio station, wherein the regions of the source audio files which are subject to overlap in a sequence have been predefined by the remote system, and wherein the predefined overlapping regions of the source audio files are un-editable by the plurality of local radio operators; and wherein the source audio files are combined, equalized, and volume mixed at the remote system hosted on the one or more remote servers, without further input from the local radio station operators, and are then sent or rendered accessible to each of the different local radio stations.

48. The web-based method of claim 1, wherein the regions of the source audio files which are subject to overlap in a sequence are defined by cue markers.

* * * * *